(12) United States Patent
Lim et al.

(10) Patent No.: US 11,760,898 B2
(45) Date of Patent: *Sep. 19, 2023

(54) HARD COATING FILM AND WINDOW AND IMAGE DISPLAY DEVICE USING SAME

(71) Applicant: DONGWOO FINE-CHEM CO., LTD., Jeollabuk-do (KR)

(72) Inventors: Geo-San Lim, Seoul (KR); Min-Kyung Kang, Gyeonggi-do (KR); Seung-Hee Kim, Gyeonggi-do (KR); Hye-Lin Kim, Busan (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 279 days.

This patent is subject to a terminal disclaimer.

(21) Appl. No.: 17/035,922

(22) Filed: Sep. 29, 2020

(65) Prior Publication Data

US 2021/0139735 A1    May 13, 2021

(30) Foreign Application Priority Data

Oct. 1, 2019    (KR) .......................... 10-20190121803

(51) Int. Cl.
| | | |
|---|---|---|
| C09D 145/00 | (2006.01) | |
| C09D 4/06 | (2006.01) | |
| C08L 33/16 | (2006.01) | |
| C09D 201/00 | (2006.01) | |
| C08L 33/14 | (2006.01) | |

(52) U.S. Cl.
CPC ............ *C09D 145/00* (2013.01); *C08L 33/14* (2013.01); *C08L 33/16* (2013.01); *C09D 4/06* (2013.01); *C09D 201/005* (2013.01)

(58) Field of Classification Search
CPC ..... C09D 4/00; C09D 4/06; C08F 220/22–24; C08L 41/00; C08L 101/005; C08L 33/16
See application file for complete search history.

(56) References Cited

U.S. PATENT DOCUMENTS

| | | | |
|---|---|---|---|
| 9,042,106 B2 | 5/2015 | Chang et al. | |
| 10,809,419 B2 | 10/2020 | Jang et al. | |
| 2011/0165404 A1 | 7/2011 | Shin et al. | |
| 2015/0022889 A1* | 1/2015 | Amano | H01L 51/524 359/513 |
| 2018/0074611 A1 | 3/2018 | Park et al. | |
| 2018/0217297 A1 | 8/2018 | Kim et al. | |
| 2018/0319127 A1 | 11/2018 | Katami et al. | |
| 2018/0364396 A1* | 12/2018 | Jang | G02B 1/111 |
| 2020/0282710 A1 | 9/2020 | Washio | |
| 2021/0206934 A1 | 7/2021 | Lim et al. | |

FOREIGN PATENT DOCUMENTS

| | | | |
|---|---|---|---|
| CN | 106336803 A | 1/2017 | |
| CN | 107850693 A | 3/2018 | |
| JP | 2010-024268 A | 2/2010 | |
| JP | 2010-085564 A | 4/2010 | |
| JP | 2012-053178 A | 3/2012 | |
| JP | 2012053178 A * | 3/2012 | |
| JP | 2013-101331 A | 10/2012 | |
| JP | 2015-054461 A | 3/2015 | |
| JP | 2017-021336 A | 1/2017 | |
| JP | 2018-124395 A | 8/2018 | |
| JP | 2018-530007 A | 10/2018 | |
| JP | 2019-130890 A | 8/2019 | |
| KR | 20050010064 A | 1/2005 | |
| KR | 10-20120115883 A | 10/2012 | |
| KR | 2012-0115883 A | 10/2012 | |
| KR | 20160083293 A | 7/2016 | |
| KR | 2017-0006515 A | 1/2017 | |
| KR | 2017-0065459 A | 6/2017 | |
| KR | 2018-0087956 A | 8/2018 | |
| KR | 2018-0091252 A | 8/2018 | |
| KR | 2019-0035642 A | 4/2019 | |
| KR | 2019-0087439 A | 7/2019 | |
| KR | 2019-0092293 A | 8/2019 | |
| KR | 10-2019961 B | 9/2019 | |
| KR | 10-2019961 B1 | 9/2019 | |

(Continued)

OTHER PUBLICATIONS

Machine Translation of KR2012-0115883A. Oct. 19, 2012. (Year: 2012).*
Written Translation of Para 66-76 and 91 of KR2012-0115883A. Oct. 19, 2012. (Year: 2012).*
Xia et al. Significant Different Conductivities of the Two Grades of Poly(3,4-ethylenedioxythiophene):Poly(styrenesulfonate), Clevios P and Clevios PH1000, Arising from Different Molecular Weights. ACS Appl. Mater. Interfaces 2012, 4, 4131-4140. (Year: 2012).*
Machine Translation of JP2012-053178A. Mar. 15, 2012. (Year: 2012).*

(Continued)

*Primary Examiner* — Stephen E Rieth

(74) *Attorney, Agent, or Firm* — Venable LLP

(57) ABSTRACT

The present invention relates to a hard coating film including a substrate and a hard coating layer provided on at least one surface of the substrate, in which the hard coating layer includes a fluorine-based UV-curable-functional-group-containing compound, a conductive polymer, and a solvent, the conductive polymer being included in a specific amount, and the surface roughness (Ra) value of the hard coating layer is 1 nm or less, whereby the hard coating film can simultaneously exhibit hard coating performance and antifouling performance even in the form of a single layer not including a separate antifouling layer, and is remarkably improved in an antifouling effect based on the low surface roughness thereof due to the absence of inorganic fine particles, and the improved antifouling effect can be effectively maintained even in the presence of variously changing environmental conditions, and to a window and an image display device using the same.

10 Claims, 1 Drawing Sheet

(56) References Cited

FOREIGN PATENT DOCUMENTS

WO     2018-004288 A2    1/2018
WO     2018004288 A2    1/2018

OTHER PUBLICATIONS

Palumbo, F. and Di Mundo, R. Polymer Surface Characterization. Chapter 7 , Wettability: Significance and Measurement. Water de Gruyter GmbH. 2014. pp. 207-210. (Year: 2014).*

\* cited by examiner

Fig. 1A
Fig. 1B
Fig. 1C
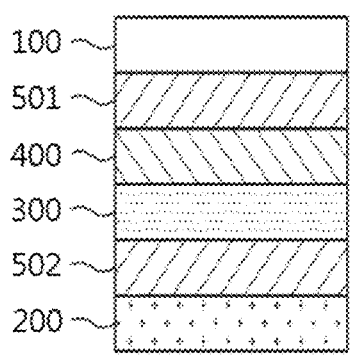
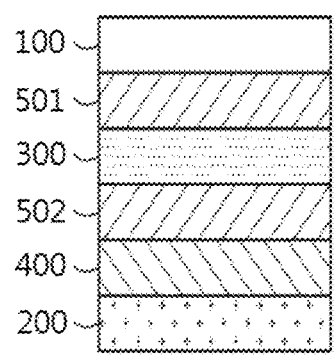
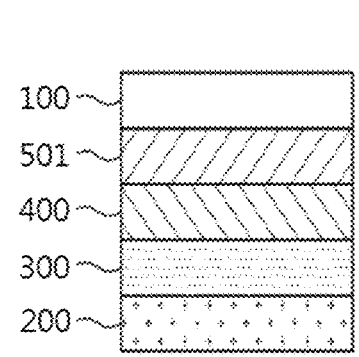

HARD COATING FILM AND WINDOW AND IMAGE DISPLAY DEVICE USING SAME

CROSS REFERENCE TO RELATED APPLICATION

This application claims the benefit of Korean Patent Application No. KR 10-2019-0121803, filed on Oct. 1, 2019, which is hereby incorporated by reference in its entirety into this application.

BACKGROUND OF THE INVENTION

1. Technical Field

The present invention relates to a hard coating film and to a window and an image display device including the same.

2. Description of the Related Art

A hard coating film is used for the purpose of surface protection on various display panels, for example, liquid crystal displays (LCDs), plasma display panels (PDPs), cathode ray tubes (CRTs), electroluminescent (EL) displays and the like. Such a hard coating film imparts hard coating performance to the surface to be protected, and at the same time imparts resistance to marking by fingerprints, markers and the like. Moreover, it imparts a property of enabling contaminants to be easily removed when the surface to be protected is contaminated, that is, antifouling performance.

In particular, there is increasing interest in touch screen panels, but touch screen panels are disadvantageous in that the screen is exposed in many cases, and there are many opportunities for direct contact with a finger or a stylus, so contaminants tend to adhere thereto. Therefore, in order to improve the appearance or visibility thereof, there is growing demand for technology that makes it difficult for fingerprints to adhere to the surface of a display, or for antifouling performance that prevents contaminants from adhering.

In this regard, Korean Patent Application Publication No. 10-2016-0083293 discloses a coating composition including a fluorocarbon polymer, at least one slip agent selected from the group consisting of a polyether-modified polydimethylsiloxane-based compound, a fluorine-modified polyacrylate-based compound, and a perfluoropolyether-based compound, and a solvent. The composition of the above document is imparted with superior slippage properties by lowering the coefficient of friction, and is high in both initial contact angle and late contact angle measured after wear resistance testing, thus exhibiting a superior initial contamination prevention effect and high durability. However, the above composition merely forms a thin antifouling layer on the rigid glass surface, and when applied to a film for use in a recently required flexible image display device, it is difficult to ensure durability because a functional group that may react chemically is not contained. Furthermore, there is a disadvantage in that a separate hard coating layer is additionally required for increasing the hardness of the plastic film substrate and preventing scratching.

Also, Korean Patent Application Publication No. 10-2005-0010064 discloses an object on which a composite hard coating layer is formed, the composite hard coating layer including a hard coating layer provided on the surface of the object and an antifouling surface layer provided on the surface of the hard coating layer. The hard coating layer of the above document is formed of a cured product of a hard coating composition including an active-energy-ray-curable compound, the antifouling surface layer is formed of a cured product of a surface material including a multifunctional (meth)acrylate compound containing fluorine and a monofunctional (meth)acrylate compound containing fluorine, and the antifouling surface layer is fixed to the hard coating layer, whereby the composite hard coating layer is imparted with superior antifouling performance. However, the hard coating layer and the antifouling layer are manufactured separately and then attached, and thus the process is complicated and time-consuming and thus not suitable for mass production. Moreover, antifouling performance does not reach the level enabling applicability to a flexible image display device.

CITATION LIST

Patent Literature

Korean Patent Application Publication No. 10-2016-0083293 (Jul. 12, 2016)
Korean Patent Application Publication No. 10-2005-0010064 (Jan. 26, 2005)

SUMMARY OF THE INVENTION

The present invention has been made keeping in mind the problems encountered in the related art, and an objective of the present invention is to provide a hard coating film, which may exhibit hard coating performance and antifouling performance even in the form of a single layer and may have superior surface roughness and thus significantly improved antifouling performance, and a window and an image display device including the same.

In order to accomplish the above objective, the present invention provides a hard coating film including a substrate and a hard coating layer provided on at least one surface of the substrate, in which the hard coating layer includes a fluorine-based UV-curable-functional-group-containing compound, a conductive polymer, and a solvent, the solid content of the conductive polymer is 0.05 to 5 wt % based on a total of 100 wt % of solid content of a hard coating composition including the same, the hard coating layer does not include inorganic fine particles, and the surface roughness Ra of the hard coating layer, measured using an atomic force microscope (AFM) (Measurement conditions: Non-contact mode, scan size: 1 µM×1 µM, scan rate: 1.0 Hz), is 1 nm or less.

In addition, the present invention provides an image display device including the hard coating film as described above.

In addition, the present invention provides a window for a flexible display device including the hard coating film as described above.

According to the present invention, a hard coating film can simultaneously exhibit hard coating performance and antifouling performance even in the form of a single layer that does not include a separate antifouling layer, and the surface roughness thereof is low and thus antifouling performance is remarkably improved, and the improved antifouling performance can be effectively maintained even in the presence of variously changing environmental conditions.

According to the present invention, an image display device includes the hard coating film as described above, and thus has the same advantages as described above.

According to the present invention, a window includes the hard coating film as described above, and thus has the same advantages as described above.

BRIEF DESCRIPTION OF DRAWINGS

FIG. 1A shows the configuration of an image display device according to an embodiment of the present invention having a display panel (200), a lower adhesive layer or a pressure-sensitive adhesive layer (502), a touch sensor (300), a polarizing plate (400), an upper adhesive layer or an upper pressure-sensitive adhesive layer (501), and a window (100) that may be sequentially laminated.

FIG. 1B shows the configuration of an image display device according to an embodiment of the present invention having a display panel (200), a polarizing plate (400), a lower adhesive layer or a lower pressure-sensitive adhesive layer (502), a touch sensor (300), an upper adhesive layer or an upper pressure-sensitive adhesive layer (501), and a window (100) that may be sequentially laminated.

FIG. 1C shows the configuration of an image display device according to an embodiment of the present invention having a display panel (200), a touch sensor (300), a polarizing plate (400), an adhesive layer or a pressure-sensitive adhesive layer (501), and a window (100) that may be sequentially laminated.

DESCRIPTION OF SPECIFIC EMBODIMENTS

When a member is said to be located "on" another member in the present invention, it can be directly on the other member, or intervening members may be present therebetween.

When a portion is said to "comprise" or "include" an element in the present invention, this means that other elements may be further included, rather than excluding such other elements, unless otherwise specified.

Hereinafter, a detailed description will be given of the present invention.

An aspect of the present invention pertains to a hard coating film including a substrate and a hard coating layer provided on at least one surface of the substrate, in which the hard coating layer includes a fluorine-based UV-curable-functional-group-containing compound, a conductive polymer, and a solvent, the solid content of the conductive polymer is 0.05 to 5 wt % based on a total of 100 wt % of solid content of a hard coating composition including the same, the hard coating layer does not include inorganic fine particles, and the surface roughness Ra of the hard coating layer measured using an atomic force microscope (AFM) (Measurement conditions: Non-contact mode, scan size: 1 μM×1 μM, scan rate: 1.0 Hz) is 1 nm or less. Thereby, the hard coating film may simultaneously exhibit hard coating performance and antifouling performance even in the form of a single layer that does not include a separate antifouling layer. The antifouling effect thereof is remarkably improved based on a low surface roughness value due to the absence of inorganic fine particles, and the improved antifouling effect is effectively maintained even in the presence of variously changing environmental conditions.

The solid content of the conductive polymer is 0.05 to 5 wt %, preferably 0.1 to 3 wt %, and more preferably 0.2 to 2 wt %, based on a total of 100 wt % of solid content of the hard coating composition. If the solid content of the conductive polymer is less than the above lower limit, the distance between molecules may increase, and thus electrical conductivity may decrease, so the antistatic effect may deteriorate. On the other hand, if the solid content thereof exceeds the above upper limit, light transmittance of the hard coating film may decrease due to absorption of light. Hence, when the solid content thereof satisfies the above range, there are advantages of a superior antistatic effect and high light transmittance.

The hard coating film according to an aspect of the present invention is characterized in that it does not include inorganic fine particles. Even though the hard coating film of the present invention does not include inorganic fine particles, antistatic performance is realized by appropriately combining other components. The surface roughness value of the hard coating layer is lowered due to the absence of inorganic fine particles. Specifically, the surface roughness value measured using an AFM (atomic force microscope) may be 1 nm or less, preferably 0.1 to 0.8 nm, and more preferably 0.1 to 0.7 nm.

The inorganic fine particles may be, for example, metal oxide, and specific examples thereof may include $SiO_2$, $Al_2O_3$, ZnO, $ZrO_2$, $BaTiO_3$, $TiO_2$, $Ta_2O_5$, $Ti_3O_5$, ITO, IZO, ATO, ZnO—Al, $Nb_2O_3$, SnO, $SnO_2$, MgO, $Sb_2O_5$, etc., but are not limited thereto.

The hard coating film according to the present invention includes a substrate, specifically a transparent substrate.

The substrate may be used without particular limitation, so long as it is a substrate used in the art, and specifically, a film having superior transparency, mechanical strength, thermal stability, moisture-blocking properties, isotropic properties, etc. may be used.

More specifically, the substrate may be a film including at least one selected from among thermoplastic resins, including a polyester-based resin such as polyethylene terephthalate, polyethylene isophthalate, polyethylene naphthalate, polybutylene terephthalate and the like; a cellulose-based resin such as diacetyl cellulose, triacetyl cellulose and the like; a polycarbonate-based resin; an acrylic resin such as polymethyl (meth)acrylate, polyethyl (meth)acrylate and the like; a styrene-based resin such as polystyrene, an acrylonitrile-styrene copolymer and the like; a polyolefin-based resin such as polyethylene, polypropylene, polyolefin having a cyclic or norbomene structure, an ethylene-propylene copolymer and the like; a vinyl-chloride-based resin; an amide-based resin such as nylon, aromatic polyamide and the like; an imide-based resin; a sulfone-based resin; a polyether-sulfone-based resin; a polyetheretherketone-based resin; a polyphenylene-sulfide-based resin; a vinyl-alcohol-based resin; a vinylidene-chloride-based resin; a vinyl-butyral-based resin; an allylate-based resin; a polyoxymethylene-based resin; an epoxy-based resin, and the like, and a film including a blend of thermoplastic resins may be used. Also, a film including a (meth)acryl-, urethane-, acrylurethane-, epoxy-, or silicone-based thermosetting resin and/or UV-curable resin may be used. According to an embodiment of the present invention, it is preferable to use a polyimide-based resin or a polyester-based resin film, which has superior resistance to repeated bending and may thus be more easily applied to a flexible image display device.

The thickness of the substrate may be 20 to 100 μM, and preferably 30 to 80 μM. When the thickness of the substrate falls within the above range, the strength of the hard coating film including the same may be enhanced and thus processability may be increased, transparency may be prevented from decreasing, and the film may be lightweight.

The hard coating film according to the present invention may include a hard coating layer provided on at least one surface of the substrate, and the hard coating layer preferably includes a cured product of a hard coating composition containing a fluorine-based UV-curable-functional-group-containing compound, a conductive polymer, and a solvent.

The fluorine-based UV-curable-functional-group-containing compound serves to impart antifouling performance, wear resistance or chemical resistance, and the type thereof is not particularly limited in the present invention, so long as it contains a fluorine component and also has a UV-curable functional group, and thus may be chemically coupled with other components included therewith.

For example, at least one selected from among a perfluoro-alkyl-group-containing (meth)acrylate, a perfluoro-polyether-group-containing (meth)acrylate, a perfluoro-cycloaliphatic-group-containing (meth)acrylate, and a perfluoro-aromatic-group-containing (meth)acrylate may be included, and may be used alone or in combinations of two or more thereof, but the present invention is not limited thereto. In an embodiment of the present invention, the solid content of the fluorine-based UV-curable-functional-group-containing compound may be 0.01 to 10 wt %, preferably 0.03 to 8 wt %, and more preferably 0.05 to 5 wt %, based on a total of 100 wt % of solid content of the hard coating composition. When the solid content of the fluorine-based UV-curable-functional-group-containing compound falls within the above range, superior wear resistance and a high antifouling effect may be desirably imparted thereto. If the solid content of the UV-curable-functional-group-containing compound is less than the above lower limit, it may be somewhat difficult to achieve sufficient wear resistance or antifouling performance. On the other hand, if the solid content thereof exceeds the above upper limit, properties of film hardness or scratch resistance may be somewhat deteriorated.

As commercial products of the fluorine-based UV-curable compound, KY-1203, available from Shin-Etsu Chemical, FS-7025, FS-7026, FS-7031, and FS-7032, available from Fluoro Technology, and the like, may be used, but the present invention is not limited thereto.

The conductive polymer has superior charge transport properties, and thereby serves to impart antistatic properties to the hard coating layer.

The type of the conductive polymer is not particularly limited in the present invention, and may include at least one selected from among, for example, polymers containing repeating units derived from thiophene, carbazole, phenylene, vinylene, acetylene, aniline, phenylenediamine and pyrrole monomers, viologen derivatives, phenothiazine, and tetrathiafulvalene, which may be used alone or in combinations of two or more thereof.

In an embodiment of the present invention, it is preferable to use a thiophene-based polymer as the conductive polymer. Since the thiophene-based polymer maintains a stable structure even under high-temperature and high-humidity conditions, there is an advantage of improving retention of antistatic performance. Specifically, when the hard coating composition of the present invention uses the thiophene-based polymer, the surface resistance value of the hard coating layer including the same may be maintained at a level of 1E+8 to 1E+12Ω/□ even under high-temperature and high-humidity conditions. There is an advantage in that superior antistatic performance and high antifouling performance may be maintained even in the presence of variously changing environmental conditions.

The solvent may be used without limitation, so long as it is capable of dissolving or dispersing each component included in the composition and is known as a solvent for a composition for forming a coating layer in the art. Moreover, in the process of applying the composition onto a substrate and drying the same, the solvent plays a role of providing time to allow the fluorine-based UV-curable-functional-group-containing compound to rise to the outermost surface of the coating layer due to the difference in surface tension.

The solvent preferably includes, for example, alcohols (e.g., methanol, ethanol, isopropanol, butanol, methyl cellosolve, ethyl cellosolve, and the like), ketones (e.g., methyl ethyl ketone, methyl butyl ketone, methyl isobutyl ketone, diethyl ketone, dipropyl ketone, cyclohexanone, and the like), acetates (ethyl acetate, propyl acetate, normal-butyl acetate, tertiary butyl acetate, methyl cellosolve acetate, ethyl cellosolve acetate, propylene glycol monomethyl ether acetate, propylene glycol monoethyl ether acetate, propylene glycol monopropyl ether acetate, methoxybutyl acetate, methoxypentyl acetate, and the like), hexanes (hexane, heptane, octane, and the like), benzenes (benzene, toluene, xylene and the like), and ethers (diethylene glycol dimethyl ether, diethylene glycol diethyl ether, diethylene glycol dipropyl ether, diethylene glycol dibutyl ether, propylene glycol monomethyl ether, and the like), which may be used alone or in combinations of two or more thereof.

The amount of the solvent may be 10 to 95 wt % based on a total of 100 wt % of the hard coating composition. When the amount of the solvent falls within the above range, appropriate viscosity and dryness may be imparted to the hard coating composition containing the same, thus increasing workability, and moreover, adhesion may be enhanced by sufficiently swelling the substrate.

In an embodiment of the present invention, the hard coating composition may further include at least one selected from among a light-transmissive resin, a photoinitiator, and an additive.

The light-transmissive resin is a UV-curable resin, and the UV-curable resin may include a UV-curable (meth)acrylate oligomer and/or monomer, but is not limited thereto.

The UV-curable (meth)acrylate oligomer may include epoxy (meth)acrylate, urethane (meth)acrylate, ester (meth)acrylate, dendritic (meth)acrylate, and the like, and the hard coating composition according to an embodiment of the present invention may include dendritic (meth)acrylate.

The urethane (meth)acrylate may be prepared from a multifunctional (meth)acrylate having a hydroxyl group in the molecule and a compound having an isocyanate group in the presence of a catalyst.

Specific examples of the (meth)acrylate having a hydroxyl group in the molecule include at least one selected from the group consisting of 2-hydroxyethyl (meth)acrylate, 2-hydroxyisopropyl (meth)acrylate, 4-hydroxybutyl (meth)acrylate, caprolactone ring-opened hydroxyacrylate, pentaerythritol tri/tetra(meth)acrylate mixtures, and dipentaerythritol penta/hexa(meth)acrylate mixtures.

Specific examples of the compound having an isocyanate group include at least one selected from the group consisting of 1,4-diisocyanatobutane, 1,6-diisocyanatohexane, 1,8-diisocyanatooctane, 1,12-diisocyanatododecane, 1,5-diisocyanato-2-methylpentane, trimethyl-1,6-diisocyanatohexane, 1,3-bis(isocyanatomethyl)cyclohexane, trans-1,4-cyclohexene diisocyanate, 4,4'-methylenebis(cyclohexyl isocyanate), isophorone diisocyanate, toluene-2,4-diisocyanate, toluene-2,6-diisocyanate, xylene-1,4-diisocyanate, tetramethylxylene-1,3-diisocyanate, 1-chloromethyl-2,4-diisocyanate, 4,4'-methylenebis(2,6-dimethylphenyl isocyanate), 4,4'-oxybis(phenyl isocyanate), trifunctional isocyanate derived from hexamethylene diisocyanate, and trimethylene propanol adduct toluene diisocyanate.

The monomer that is used may be a typical one, and examples of the UV-curable functional group include those having an unsaturated group such as a (meth)acryloyl group, a vinyl group, a styryl group, an allyl group, etc. in the molecule, and among these, a (meth)acryloyl group is preferable.

Specific examples of the monomer having a (meth)acryloyl group include at least one selected from the group consisting of neopentyl glycol acrylate, 1,6-hexanediol (meth)acrylate, propylene glycol di(meth)acrylate, triethylene glycol di(meth)acrylate, dipropylene glycol di(meth)acrylate, polyethylene glycol di(meth)acrylate, polypropylene glycol di(meth)acrylate, trimethylolpropane tri(meth)acrylate, trimethylolethane tri(meth)acrylate, 1,2,4-cyclohexane tetra(meth)acrylate, pentaglycerol tri(meth)acrylate, pentaerythritol tetra(meth)acrylate, pentaerythritol tri(meth)acrylate, dipentaerythritol tri(meth)acrylate, dipentaerythritol penta(meth)acrylate, dipentaerythritol tetra(meth)acrylate, dipentaerythritol hexa(meth)acrylate, tripentaerythritol tri(meth)acrylate, tripentaerythritol hexa tri (meth)acrylate, bis(2-hydroxyethyl)isocyanurate di(meth)acrylate, hydroxyethyl (meth)acrylate, hydroxypropyl (meth)acrylate, hydroxybutyl (meth)acrylate, isooctyl (meth)acrylate, isodecyl (meth)acrylate, stearyl (meth)acrylate, tetrahydrofurfuryl (meth)acrylate, phenoxyethyl (meth)acrylate, and isobomeol (meth)acrylate.

As the light-transmissive resin listed above, the UV-curable (meth)acrylate oligomer and monomer may be used alone or in combinations of two or more thereof.

The dendritic (meth)acrylate is a (meth)acrylate oligomer having a dendritic structure. Here, the term "dendritic structure" refers to a shape in which a monomer is branched in a radiating form from one nucleus, and polymerizes and spreads radially. The dendritic (meth)acrylate may be used without limitation, so long as it has the above-described form. Commercially available dendritic (meth)acrylate products include Miramer SP1106 made by Miwon, Viscoat 1000, Viscoat 1020, and Viscoat 1080 made by Osaka Organic Chemical, and the like.

The dendritic acrylate may prevent the density of crosslinking of the cured product from excessively increasing, and moreover, the radiation-type structure thereof serves to alleviate the rigidity of the cured product having increased crosslinking density, and thus the dendritic acrylate has an advantage of providing flexibility while maintaining hardness, especially scratch resistance, when the cured product is formed. When the hard coating composition of the present invention includes dendritic acrylate, it is improved in bending resistance and is thus more favorably applicable to a flexible display device.

According to an embodiment of the present invention, when the light-transmissive resin further includes dendritic acrylate, the solid content of the dendritic acrylate may be 3 to 90 wt, preferably 5 to 80 wt %, and more preferably 10 to 70 wt % based on a total of 100 wt % of solid content of the hard coating composition.

When the solid content of the dendritic acrylate satisfies the above range, a high degree of curing and flexibility of the cured product of the hard coating composition including the same may be exhibited. If the solid content thereof is less than the above lower limit, the degree of curing or flexibility may be somewhat decreased. On the other hand, if the solid content thereof exceeds the above upper limit, scratch resistance may be somewhat decreased.

Preferably, the light-transmissive resin includes both the dendritic acrylate and the urethane (meth)acrylate. Here, there is an advantage in that it is possible to obtain a hard coating layer having a high degree of curing and high flexibility.

When the light-transmissive resin is further included in the hard coating composition of the present invention, the solid content thereof is 1 to 80 wt %, preferably 10 to 70 wt %, and more preferably 30 to 50 wt %, based on a total of 100 wt % of solid content of the hard coating composition including the light-transmissive resin. If the solid content of the light-transmissive resin is less than the above lower limit, it may be difficult to anticipate a satisfactory hardness improvement effect. On the other hand, if the solid content thereof exceeds the above upper limit, a curling phenomenon may occur. When the solid content of the light-transmissive resin falls within the above range, hardness may be sufficiently increased and curling may be prevented from occurring.

When the hard coating composition of the present invention includes urethane (meth)acrylate in addition to the dendritic (meth)acrylate, the solid content of the dendritic (meth)acrylate may be 5 to 80 wt %, preferably 7 to 75 wt %, and more preferably 10 to 70 wt %, based on a total of 100 wt % of the light-transmissive resin, and the urethane (meth)acrylate may be included in the remaining amount so as to total 100 wt % of the light-transmissive resin.

For example, the dendritic (meth)acrylate and urethane (meth)acrylate may be included at a weight ratio of 1:0.4 to 1:9. When the weight ratio thereof satisfies the above range, both hardness and flexibility of the cured product of the hard coating composition including the same may be ensured.

The photoinitiator may be included to induce photocuring of the hard coating composition, and may include, for example, a photo-radical initiator capable of forming a radical upon irradiation with light.

Examples of the photoinitiator include Type 1 initiators, which generate radicals through decomposition of molecules due to differences in chemical structure or molecular binding energy, and Type 2 initiators, which coexist with tertiary amines to induce hydrogen abstraction.

For example, the Type 1 initiator may include at least one selected from among acetophenones, such as 4-phenoxy dichloroacetophenone, 4-t-butyl dichloroacetophenone, 4-t-butyl trichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl)ketone, 1-hydroxycyclohexylphenylketone, and the like; benzoins, such as benzoin, benzoin methyl ether, benzoin ethyl ether, benzyl dimethyl ketal, and the like; phosphine oxides; and titanocene compounds.

For example, the Type 2 initiator may include at least one selected from among benzophenones, such as benzophenone, benzoylbenzoic acid, benzoylbenzoic acid methyl ether, 4-phenylbenzophenone, hydroxybenzophenone, 4-benzoyl-4'-methyldiphenylsulfide, 3,3'-methyl-4-methoxybenzophenone, and the like, and thioxanthone compounds, such as thioxanthone, 2-chlorothioxanthone, 2-methyl thioxanthone, 2,4-dimethyl thioxanthone, isopropyl thioxanthone, and the like.

These photoinitiators may be used alone or in combinations of two or more thereof, and Type 1 and Type 2 photoinitiators may be used in a mixture thereof.

The amount of the photoinitiator is not particularly limited in the present invention, and may be 0.1 to 10 wt %, and preferably about 0.1 to 5 wt %, based on a total of 100 wt % of the hard coating composition including the same. If the amount of the photoinitiator is less than about 0.1 wt %, sufficient curing may not occur, and thus mechanical properties and adhesion of the hard coating film or the hard coating layer may not be realized. On the other hand, if the amount of the photoinitiator exceeds about 10 wt %, curing shrinkage may occur in the (meth)acrylate group contained in the polymerizable compounds, resulting in poor adhesion, cracking, and curling.

The hard coating composition according to the present invention may further include a UV stabilizer, a heat stabilizer, and the like.

The UV stabilizer is an additive added for the purpose of protecting the adhesive by blocking or absorbing UV rays because the surface of the cured coating film decomposes and becomes discolored and brittle upon continuous UV exposure.

The UV stabilizer may include an absorber, a quencher, and a hindered amine light stabilizer (HALS), as classified depending on the mechanism of action thereof, or may include phenyl salicylate (absorber), benzophenone (absorber), benzotriazole (absorber), a nickel derivative (quencher), and a radical scavenger, as classified depending on the chemical structure thereof. Moreover, a UV stabilizer commonly used in the art may be used.

The heat stabilizer may include, but is not limited to, a polyphenol-based primary heat stabilizer, a phosphite-based secondary heat stabilizer, and a lactone-based secondary heat stabilizer, as commercially applicable products, which may be used alone or in combinations.

The UV stabilizer and the heat stabilizer may be used by appropriately adjusting the amounts thereof so as not to affect UV curability.

The hard coating composition according to the present invention may further include a polymer compound, a photostimulator, an antioxidant, a UV absorber, a thermal polymerization inhibitor, a surfactant, a lubricant, an antifouling agent and the like, which are commonly used in the art within a range that does not impair the effects of the present invention, in addition to the above components. Here, the type and amount of each additive may be appropriately selected by those of ordinary skill in the art.

The hard coating film of the present invention has superior antifouling performance. Specifically, the water contact angle, measured on the surface of the hard coating layer using a contact angle meter DSA100 made by KRUSS, may be 110° to 120°, preferably 112° to 120°, and more preferably 115° to 120°. Here, the higher the water contact angle, the lower the surface energy of the hard coating layer, and thus the better the antifouling performance.

The hard coating film of the present invention has high wear resistance, and the water contact angle, measured after the surface of the hard coating layer is rubbed and worn 3000 times under a load of 1 kg using an eraser for wear resistance testing, may be 95° or more, preferably 98° or more, and more preferably 100° or more. As such, the hard coating film of the present invention is capable of maintaining a superior water contact angle even after wear resistance testing, and particularly, may exhibit superior wear resistance by maintaining high antifouling performance even when exposed to wear conditions.

The hard coating film of the present invention has high chemical resistance, and the water contact angle, measured after ethanol is dropped on the surface of the hard coating layer and the surface thereof is then rubbed 3000 times under a load of 1 kg using an eraser for wear resistance testing, may be 95° or more, preferably 98° or more, and more preferably 100° or more. As such, the hard coating film of the present invention is capable of maintaining a superior water contact angle even after chemical resistance testing. Particularly, the surface change of the hard coating film is small even when exposed to chemical wear conditions, so high antifouling performance is maintained, thereby exhibiting superior chemical resistance.

The hard coating film of the present invention has superior antistatic performance. Specifically, the surface resistance value thereof when a voltage of 500 V is applied to the surface of the hard coating layer may be $1E+8\Omega/\square$ to $1E+12\Omega/\square$, preferably $1E+9\Omega/\square$ to $5E+11\Omega/\square$, and more preferably $1E+9\Omega/\square$ to $1E+11\Omega/\square$. When the surface resistance value thereof falls within the above range, superior antistatic performance may be exhibited, whereas at values below the above lower limit, transmittance may be somewhat lowered, and mechanical strength may be somewhat lowered with a decrease in the degree of crosslinking.

The hard coating film of the present invention has superior retention of antistatic performance. Specifically, the surface resistance value thereof when a voltage of 500 V is applied to the surface of the hard coating layer after the hard coating film is allowed to stand under conditions of a temperature of 85° C. and a humidity of 85% for 15 days may be $1E+8\Omega/\square$ to $5E+12\Omega/\square$, preferably $1E+9\Omega/\square$ to $1E+12\Omega/\square$, and more preferably $1E+9\Omega/\square$ to $5E+11\Omega/\square$. As such, the surface resistance value thereof is maintained within the above range even under high-temperature and high-humidity conditions, thereby exhibiting superior retention of antistatic performance. Below the above lower limit, transmittance may be somewhat lowered, and mechanical strength may be somewhat lowered with a decrease in the degree of crosslinking.

The hard coating film according to the present invention may be formed by applying the hard coating composition as described above on one or both surfaces of the substrate and then performing curing.

When forming a hard coating film using the hard coating composition as described above, both hard coating performance and antifouling performance may be simultaneously realized even in the form of a single layer that does not include a separate antifouling layer through a single coating process. Moreover, the surface roughness of the hard coating layer is lowered due to the absence of inorganic fine particles, thereby remarkably improving antifouling performance, and the improved antifouling performance is effectively maintained even in the presence of variously changing environmental conditions (e.g. physical and chemical wear or contamination due to chemicals, etc.).

The hard coating layer may be formed through an appropriate process selected from among die coating, air-knife coating, reverse-roll coating, spray coating, blade coating, casting, gravure coating, microgravure coating, and spin coating.

The thickness of the hard coating layer may be 2 μM to 200 μM, particularly 2 μM to 100 μM, and more particularly 2 μM to 30 μM, but is not limited thereto. However, when the thickness of the coating layer satisfies the above range, it is possible to manufacture a hard coating film that is both hard and flexible and is thus applicable to flexible display devices, is capable of being formed thinly, and maintains antifouling performance. The thickness of the coating layer is the thickness after curing.

The specific method and conditions for each step of forming the hard coating layer are typical, and are not particularly limited in the present invention. For example, the hard coating composition that is applied is dried through evaporation of volatile materials for 10 sec to 1 hr, and particularly 30 sec to 10 min, at a temperature of 30 to 150° C., after which the hard coating composition is irradiated with UV light and cured, thereby forming a hard coating layer. Here, the dose of UV light may be about 100 to 2000 mJ/cm², and particularly 200 to 1000 mJ/cm².

The hard coating film may be used for a flexible display, and specifically, it may be used to replace a touch panel for displays such as LCDs, OLEDs, LEDs, FEDs, etc., various mobile communication terminals using the same, smartphones or tablet PCs, and a cover glass for electronic paper, or may be used as a functional layer.

Another aspect of the present invention pertains to a window including the hard coating film as described above.

The window may serve to protect elements included in the image display device from external impacts or changes in ambient temperature and humidity, and a light-blocking pattern may be further formed on the periphery of one surface of the window. The light-blocking pattern may include, for example, a printed color pattern, and may have a monolayer structure or a multilayer structure. A bezel portion or a non-display region of the image display device may be defined by the light-blocking pattern.

The hard coating film according to the present invention satisfies requirements for high hardness and wear resistance of the hard coating film and simultaneously has superior antifouling performance and high bending resistance, so it is applicable to a hard coating for flexible surface treatment when used on a plastic substrate.

Still another aspect of the present invention pertains to an image display device including the window 100 and a display panel 200, and further including a touch sensor 300 and a polarizing plate 400 between the window 100 and the display panel 200.

The image display device may include a liquid crystal display device, an OLED, a flexible display, and the like, but is not limited thereto, and all image display devices known in the art may be applicable.

The display panel 200 may include a pixel electrode, a pixel definition film, a display layer, a counter electrode, and an encapsulation layer disposed on a panel substrate, but is not limited thereto. As necessary, elements used in the art may be further included.

As an example, a pixel circuit including a thin-film transistor (TFT) may be formed on the panel substrate, and an insulating film may be formed to cover the pixel circuit. Here, the pixel electrode may be electrically connected to, for example, a drain electrode of the TFT on the insulating film. The pixel definition film may be formed on the insulating film to expose the pixel electrode to thereby define a pixel region. A display layer may be formed on the pixel electrode, and the display layer may include, for example, a liquid crystal layer or an organic light-emitting layer. A counter electrode may be disposed on the pixel definition film and the display layer, and the counter electrode may be provided, for example, as a common electrode or a cathode of the image display device. An encapsulation layer protecting the display panel may be laminated on the counter electrode.

The touch sensor 300 is used as input means. As the touch sensor 300, for example, various types thereof, such as a resistive film type, a surface-elastic-wave type, an infrared-ray type, an electromagnetic induction type, a capacitive type and the like are proposed. The type thereof is not particularly limited in the present invention, but a capacitive type is particularly preferred.

The capacitive touch sensor is divided into an active region and an inactive region located outside the active region. The active region is a region corresponding to a region (display part) in which the screen is displayed on the display panel, and is a region in which a user's touch is sensed, and the inactive region is a region corresponding to a region (non-display part) in which the display device screen is not displayed. The touch sensor includes a flexible substrate, a sensing pattern formed on the active region of the substrate, and individual sensing lines formed on the inactive region of the substrate and connected to an external driving circuit through the sensing pattern and the pad part. As the flexible substrate, the same material as the transparent substrate of the window may be used. Meanwhile, toughness is defined as the area beneath a stress-strain curve (%) obtained through a tensile test conducted on a polymer material to the point of failure. The touch sensor substrate preferably has a toughness of 2,000 MPa % or more in view of suppressing cracking of the touch sensor. More preferably, the toughness thereof is 2,000 MPa % to 30,000 MPa %.

The sensing pattern may include a first pattern formed in a first direction and a second pattern formed in a second direction. The first pattern and the second pattern are arranged in different directions. The first pattern and the second pattern are formed on the same layer and have to be electrically connected in order to sense a touched point. In the first pattern, individual unit patterns are connected to each other through a joint, but in the second pattern, individual unit patterns are separated from each other in an island form, and thus a separate bridge electrode is required in order to realize electrical connection of the second pattern. As the sensing pattern, a known transparent electrode material may be applied. For example, indium tin oxide (ITO), indium zinc oxide (IZO), zinc oxide (ZnO), indium zinc tin oxide (IZTO), cadmium tin oxide (CTO), poly(3,4-ethylenedioxythiophene) (PEDOT), carbon nanotubes (CNTs), graphene, metal wires, and the like may be used alone or in combinations of two or more thereof. ITO is preferably used. The metal used for the metal wires is not particularly limited, and examples thereof include silver, gold, aluminum, copper, iron, nickel, titanium, tellurium, chromium, and the like, which may be used alone or in combinations of two or more thereof.

The bridge electrode may be formed on an insulating layer by disposing the insulating layer on the sensing pattern, the bridge electrode may be formed on the substrate, and the insulating layer and the sensing pattern may be formed thereon. The bridge electrode may be formed of the same material as the sensing pattern, and may also be formed of a metal such as molybdenum, silver, aluminum, copper, palladium, gold, platinum, zinc, tin, titanium, or an alloy of two or more thereof. Since the first pattern and the second pattern need to be electrically insulated from each other, the insulating layer is formed between the sensing pattern and the bridge electrode. The insulating layer may be formed only between the joint of the first pattern and the bridge electrode, or may be formed in a layer structure covering the sensing pattern. In the latter case, the bridge electrode may connect the second pattern through a contact hole formed in the insulating layer. As means for appropriately compensating for the difference in transmittance between the pattern region in which the sensing pattern is formed and the non-pattern region in which the pattern is not formed, particularly a difference in light transmittance due to the difference in refractive index therebetween, an optical control layer may be further included between the substrate and the electrode. The optical control layer may be formed by applying a photocurable composition including a photocurable organic binder on a substrate. The photocurable composition may further include inorganic particles. The refractive index of the optical control layer may be increased by the inorganic particles.

The photocurable organic binder may include, for example, a copolymer of monomers such as an acrylate-based monomer, a styrene-based monomer, a carboxylic-acid-based monomer and the like. The photocurable organic binder may be, for example, a copolymer including different repeating units such as an epoxy-group-containing repeating unit, an acrylate repeating unit, a carboxylic-acid repeating unit and the like.

The inorganic particles may include, for example, zirconia particles, titania particles, alumina particles, and the like. The photocurable composition may further include various additives such as a photopolymerization initiator, a polymerizable monomer, a curing assistant, and the like.

The polarizing plate 400 may be configured to include a polarizer alone or a polarizer and a transparent substrate attached to at least one surface thereof. Depending on the polarization state of the light that is emitted through the polarizing plate, the polarizing plate is classified into a linear polarizing plate, a circular polarizing plate, and the like. Hereinafter, although not particularly limited in the present description, a circular polarizing plate that is capable of being used to improve visibility by absorbing reflected light is described in detail.

A circular polarizing plate is a functional layer having a function of transmitting only a right or left circularly polarized light component by laminating a $\lambda/4$ retardation plate on a linear polarizing plate. For example, the circular polarizing plate converts external light into right circularly polarized light and reflects the external light from the organic EL panel to block left circularly polarized external light, and transmits only the light-emitting component of the organic EL to suppress the influence of the reflected light, thereby making an image easy to see. In order to achieve the circular polarization function, the absorption axis of the linear polarizing plate and the slow axis of the $\lambda/4$ retardation plate have to be 45° in theory, but may be 45±10° in practice. The linear polarizing plate and the $\lambda/4$ retardation plate do not necessarily need to be laminated adjacent to each other, so long as the relationship between the absorption axis and the slow axis satisfies the above range. It is preferable to achieve complete circular polarization at all wavelengths, but the circular polarizing plate of the present invention may also include an elliptical polarizing plate because it is not always necessary in practice. Preferably, a $\lambda/4$ retardation film is laminated so as to be closer to the viewing side of the linear polarizing plate, thus making the emitted light circularly polarized, thereby increasing visibility in the state in which polarized sunglasses are worn.

The linear polarizing plate is a functional layer that allows light vibrating in the direction of the transmission axis to pass therethrough but blocks polarized light having a vibrational component perpendicular thereto. The linear polarizing plate may be configured to include a linear polarizer alone or a linear polarizer and a protective film attached to at least one surface thereof. The thickness of the linear polarizing plate may be 200 μM or less, and preferably 0.5 μM to 100 μM. If the thickness thereof exceeds 200 μM, flexibility may decrease.

The linear polarizer may be a film-type polarizer manufactured by dyeing and stretching a polyvinyl alcohol (PVA)-based film. A dichroic dye such as iodine is adsorbed into the PVA-based film aligned through stretching, or is stretched in the state of being adsorbed to PVA, whereby the dichroic dye is aligned, thus exhibiting polarization performance. The manufacture of the film-type polarizer may include other steps such as swelling, crosslinking with boric acid, washing with an aqueous solution, drying, and the like. The stretching and dyeing processes may be carried out using the PVA-based film alone, or may be conducted in the state in which the PVA-based film is laminated with another film such as one made of polyethylene terephthalate. The PVA-based film that is used preferably has a thickness of 10 to 100 μM, and the stretching ratio thereof is 2 to 10 times.

Moreover, another example of the polarizer may be a liquid-crystal-application-type polarizer formed by applying a liquid crystal polarization composition. The liquid crystal polarization composition may include a liquid crystal compound and a dichroic dye compound. It is sufficient for the liquid crystal compound to have a property of exhibiting a liquid crystal state, and in particular, a compound having a high-order alignment state such as a smectic phase is preferable because it may exhibit high polarization performance. It is also preferable to have a polymerizable functional group. The dichroic dye compound is a dye exhibiting dichroism by being aligned with the liquid crystal compound, and may have a polymerizable functional group, or the dichroic dye itself may have liquid crystallinity. Any one compound of the liquid crystal polarization composition has a polymerizable functional group, and the liquid crystal polarization composition may include an initiator, a solvent, a dispersant, a leveling agent, a stabilizer, a surfactant, a crosslinking agent, a silane-coupling agent, and the like. The liquid-crystal-application-type polarizer may be manufactured by applying the liquid crystal polarization composition on an alignment film to form a liquid crystal polarizer. The liquid-crystal-application-type polarizer may be formed to be thinner than the film-type polarizer. The liquid-crystal-application-type polarizer may have a thickness of 0.5 to 10 μM, and preferably 1 to 5 μM.

The alignment film may be manufactured by, for example, applying an alignment-film-forming composition on a substrate and performing alignment through rubbing, irradiation with polarized light, or the like. The alignment-film-forming composition includes an alignment agent, and may further include a solvent, a crosslinking agent, an initiator, a dispersant, a leveling agent, a silane-coupling agent, and the like. As the alignment agent, for example, polyvinyl alcohol, polyacrylates, polyamic acids, and polyimides may be used. When performing light alignment, it is preferable to use an aligning agent containing a cinnamate group. The polymer used as the alignment agent may have a weight average molecular weight of about 10,000 to 1,000,000. The thickness of the alignment film is preferably 5 nm to 10,000 nm, and particularly 10 to 500 nm, within which range the alignment control force is sufficiently exhibited. The liquid crystal polarizer may be peeled off from the substrate, transferred and laminated, or the substrate may be laminated as it is. The case in which the substrate serves as a protective film, a retardation plate, or a transparent substrate for a window is also preferable.

The protective film may be a transparent polymer film, and materials and additives used for transparent substrates may be used. For a transparent substrate, reference may be made to the above description.

The $\lambda/4$ retardation plate is a film that imparts $\lambda/4$ retardation in a direction orthogonal to the traveling direction of incident light (i.e. the in-plane direction of the film). The $\lambda/4$ retardation plate may be a stretchable retardation plate manufactured by stretching a polymer film such as a cellulose-based film, an olefin-based film, a polycarbonate-based film, etc. As necessary, a retardation adjuster, a plasticizer, a UV absorber, an infrared absorber, a colorant such as a pigment or a dye, a fluorescent brightener, a dispersant, a heat stabilizer, a light stabilizer, an antistatic agent, an antioxidant, a lubricant, a solvent, and the like may be included. The thickness of the stretchable retardation plate is 200 μM or less, and preferably 1 μM to 100 μM. If the thickness thereof exceeds 200 μM, flexibility may decrease.

Also, another example of the λ/4 retardation plate may be a liquid-crystal-application-type retardation plate formed by applying a liquid crystal composition. The liquid crystal composition includes a liquid crystal compound having a property of exhibiting a liquid crystal state, such as a nematic, cholesteric, or smectic state. Any one compound including a liquid crystal compound in the liquid crystal composition has a polymerizable functional group. The liquid-crystal-application-type retardation plate may further include an initiator, a solvent, a dispersant, a leveling agent, a stabilizer, a surfactant, a crosslinking agent, a silane-coupling agent, and the like. The liquid-crystal-application-type retardation plate may be manufactured by applying the liquid crystal composition on an alignment film and performing curing to form a liquid crystal retardation layer, as described in the liquid crystal polarizer above. The liquid-crystal-application-type retardation plate may be formed to be thinner than the stretchable retardation plate. The thickness of the liquid crystal retardation layer is 0.5 to 10 μM, and preferably 1 to 5 μM. The liquid-crystal-application-type retardation plate may be peeled off from the substrate, transferred, and laminated, or the substrate may be laminated as it is. The case in which the substrate serves as a protective film, a retardation plate, or a transparent substrate for a window is also preferable.

In general, there are many materials that exhibit greater birefringence at shorter wavelengths and smaller birefringence at longer wavelengths. Here, since λ/4 retardation cannot be achieved in the entire visible light range, in-plane retardation is preferably designed to be 100 to 180 nm, and more preferably 130 to 150 nm, so that it is λ/4 in the vicinity of 560 nm, at which visibility is high. An inverse dispersion λ/4 retardation plate using a material having birefringence wavelength dispersion characteristics opposite normal characteristics is preferable because visibility may be further improved. As such materials, the stretchable retardation plate may be that described in Japanese Patent Application Publication No. 2007-232873, and the liquid-crystal-application-type retardation plate may be that described in Japanese Patent Application Publication No. 2010-30979.

As another method, a technique for obtaining a broadband λ/4 retardation plate through coupling with a λ/2 retardation plate is also known (Japanese Patent Application Publication No. 1998-90521). The λ/2 retardation plate is also manufactured using the same material and method as the λ/4 retardation plate. Although the combination of the stretchable retardation plate and the liquid-crystal-application-type retardation plate is optional, it is preferable to use the liquid-crystal-application-type retardation plate for both, because the thickness may be reduced.

There is known a method of laminating a positive C plate on a circular polarizing plate in order to increase visibility in an oblique direction (Japanese Patent Application Publication No. 2014-224837). The positive C plate may be a liquid-crystal-application-type retardation plate or a stretchable retardation plate. Retardation in the thickness direction of the retardation plate may be −200 to −20 nm, and preferably −140 to −40 nm.

The aforementioned elements and members (such as the circular polarizing plate, linear polarizing plate, retardation plate, etc.) constituting elements (the window, display panel, touch sensor, polarizing plate, etc.) may be directly bonded to each other, and for bonding, an adhesive layer or a pressure-sensitive adhesive layer 501, 502 may be further included between the elements or members.

The type of adhesive layer or pressure-sensitive adhesive layer 501, 502 is not particularly limited in the present invention, and examples of the adhesive may include an aqueous adhesive, an organic-solvent-type adhesive, a solvent-free adhesive, a solid adhesive, an aqueous-solvent-volatilization-type adhesive, a moisture-curing-type adhesive, a thermosetting adhesive, an anaerobic-curing-type adhesive, an active-energy-ray-curing-type adhesive, an adhesive mixed with a curing agent, a hot-melt-type adhesive, a pressure-sensitive-type adhesive (i.e. a pressure-sensitive adhesive), a remoistening-type adhesive, a pressure-sensitive adhesive, etc., which may be used for general purposes. Among these, an aqueous-solvent-volatilization-type adhesive, an active-energy-ray-curing-type adhesive, and a pressure-sensitive adhesive are frequently used. The thickness of the adhesive layer or the pressure-sensitive adhesive layer may be appropriately adjusted depending on the required adhesion and the like, and is 0.01 μM to 500 μM, and preferably 0.1 μM to 300 μM. Multiple adhesive layers may be present in the image display device, but the thickness and type of each adhesive layer may be the same or different.

As the aqueous-solvent-volatilization-type adhesive, a resin polymer dispersed in water, such as a polyvinyl-alcohol-based polymer, a water-soluble polymer such as starch, an ethylene-vinyl acetate-based emulsion, a styrene-butadiene-based emulsion and the like may be used. In addition to the resin polymer and water, a crosslinking agent, a silane-based compound, an ionic compound, a crosslinking catalyst, an antioxidant, a dye, a pigment, an inorganic filler, an organic solvent and the like may be included. Upon bonding with the aqueous-solvent-volatilization-type adhesive, the aqueous-solvent-volatilization-type adhesive may be injected between the adhered layers, and the adhered layers may be bonded and dried to realize adhesion. In the case of using the aqueous-solvent-volatilization-type adhesive, the thickness of the adhesive layer may be 0.01 to 10 μM, and preferably 0.1 to 1 μM. When the aqueous-solvent-volatilization-type adhesive is used in multiple layers, the thickness and type of each layer may be the same or different.

The active-energy-ray-curing-type adhesive may be formed by curing an active-energy-ray-curable composition including a reactive material that forms an adhesive layer through irradiation with active energy rays. The active-energy-ray-curable composition may contain at least one polymer of a radical polymerizable compound and a cationic polymerizable compound, as in the hard coating composition. As the radical polymerizable compound, the same compound as that in the hard coating composition may be used, and the same type as the hard coating composition may be used. The radical polymerizable compound used for the adhesive layer is preferably a compound having an acryloyl group. It is also preferable to include a monofunctional compound in order to lower the viscosity of the adhesive composition.

As the cationic polymerizable compound, the same compound as that in the hard coating composition may be used, and the same type as the hard coating composition may be used. The cationic polymerizable compound used for the active-energy-ray-curable composition is particularly preferably an epoxy compound. It is also preferable to include a monofunctional compound as a reaction diluent in order to lower the viscosity of the adhesive composition.

The active energy ray composition may further include a polymerization initiator. For the polymerization initiator, reference may be made to the above description.

The active-energy-ray-curable composition may also include an ion scavenger, an antioxidant, a chain transfer agent, an adhesion-imparting agent, a thermoplastic resin, a filler, a flow viscosity modifier, a plasticizer, a defoaming agent, an additive, and a solvent. When performing bonding using the active-energy-ray-curing-type adhesive, the active-energy-ray-curable composition may be applied onto one or both of the adhered layers and then combined, after which one adhered layer or two adhered layers may be irradiated with active energy rays, cured and bonded. When using the active-energy-ray-curing-type adhesive, the thickness of the adhesive layer is 0.01 to 20 μM, and preferably 0.1 to 10 μM. When the active-energy-ray-curing-type adhesive is used in multiple layers, the thickness and type of each layer may be the same or different.

As the pressure-sensitive adhesive, any pressure-sensitive adhesive, classified as an acrylic pressure-sensitive adhesive, a urethane-based pressure-sensitive adhesive, a rubber pressure-sensitive adhesive, a silicone pressure-sensitive adhesive or the like, depending on the type of resin polymer, may be used. In addition to the resin polymer, a crosslinking agent, a silane-based compound, an ionic compound, a crosslinking catalyst, an antioxidant, a tackifier, a plasticizer, a dye, a pigment, an inorganic filler, and the like may be included in the pressure-sensitive adhesive. Each component constituting the pressure-sensitive adhesive is dissolved and dispersed in a solvent to afford a pressure-sensitive adhesive composition, and the pressure-sensitive adhesive composition is applied onto a substrate and dried to form a pressure-sensitive adhesive layer. The pressure-sensitive adhesive layer may be formed directly on the substrate, or may be separately formed on another substrate and transferred. It is also preferable to use a release film in order to cover the adhesive surface before bonding. When using the pressure-sensitive adhesive, the thickness of the pressure-sensitive adhesive layer may be 1 to 500 μM, and preferably 2 to 300 μM. When the pressure-sensitive adhesive is used in multiple layers, the thickness and type of each layer may be the same or different.

The order of elements in the image display device of the present invention is not particularly limited in the present invention, and will be described with reference to FIGS. 1A to 1C as examples. As shown in FIG. 1A, a display panel 200, a lower adhesive layer or a lower pressure-sensitive adhesive layer 502, a touch sensor 300, a polarizing plate 400, an upper adhesive layer or an upper pressure-sensitive adhesive layer 501, and a window 100 may be sequentially laminated, and as shown in FIG. 1B, a display panel 200, a polarizing plate 400, a lower adhesive layer or a lower pressure-sensitive adhesive layer 502, a touch sensor 300, an upper adhesive layer or an upper pressure-sensitive adhesive layer 501, and a window 100 may be sequentially laminated. As shown in FIG. 1C, a display panel 200, a touch sensor 300, a polarizing plate 400, an adhesive layer or a pressure-sensitive adhesive layer 501, and a window 100 may be sequentially laminated. Here, with regard to individual elements, reference may be made to the above description.

In the image display device, as shown in FIG. 1A or 1C, the window 100, the polarizing plate 400 and the touch sensor 300 may be sequentially disposed from the user's viewing side. Here, the sensing cells of the touch sensor 300 are disposed under the polarizing plate 400, whereby pattern visibility may be more effectively prevented.

When the touch sensor 300 includes a substrate, the substrate may include, for example, triacetyl cellulose, cycloolefin, a cycloolefin copolymer, a polynorbornene copolymer, and the like, and preferably has a front retardation of ±2.5 nm or less, but is not limited thereto.

The touch sensor 300 may also be directly transferred onto the window 100 or the polarizing plate 400. Here, the image display device may be configured such that the window 100, the touch sensor 300, and the polarizing plate 400 are sequentially disposed from the user's viewing side.

The display panel 200 may be configured such that the aforementioned elements are bonded through the adhesive layer or the pressure-sensitive adhesive layer 502, as shown in FIG. 1A. Here, the adhesive layer or the pressure-sensitive adhesive layer 502 may have, for example, a viscoelasticity of about 0.2 MPa or less, preferably 0.01 to 0.15 MPa, at −20 to 80° C. In this case, noise from the display panel 200 may be blocked, and interfacial stress may be relieved during bending, thereby suppressing damage to the elements to be bonded.

A better understanding of the present invention may be obtained through the following examples, which are merely set forth to illustrate the present invention, and it will be obvious to those skilled in the art that various changes and modifications are possible within the scope and spirit of the present invention, and it will be natural that such changes and modifications fall within the accompanying claims. Unless otherwise mentioned, "%" and "part", indicating amounts in the following examples and comparative examples, are given on a weight basis.

PREPARATION EXAMPLES: PREPARATION OF HARD COATING COMPOSITION

Preparation Example 1

A hard coating composition was prepared by mixing 20 wt % of 6-functional urethane acrylate (UA-1100H, Shin-Nakamura Chemical), 25 wt % of dendritic acrylate (MIRAMER SP1106, Miwon), 17 wt % of a conductive polymer (SAS-F16, solid content: 1%, Shin-Etsu Polymer), 3 wt % of 1-hydroxycyclohexylphenylketone, 0.3 wt % of a fluorine-based UV-curable-functional-group-containing compound (KY-1203, solid content: 20%, Shin-Etsu Chemical), and 34.7 wt % of methyl ethyl ketone using a stirrer, followed by filtration using a filter made of a PP material.

Preparation Example 2

A hard coating composition was prepared by mixing 15 wt % of 6-functional urethane acrylate (UA-1100H, Shin-Nakamura Chemical), 30 wt % of dendritic acrylate (MIRAMER SP1106, Miwon), 17 wt % of a conductive polymer (SAS-F16, solid content: 1%, Shin-Etsu Polymer), 3 wt % of 1-hydroxycyclohexylphenylketone, 0.3 wt % of a fluorine-based UV-curable-functional-group-containing compound (KY-1203, solid content: 20%, Shin-Etsu Chemical), and 34.7 wt % of methyl ethyl ketone using a stirrer, followed by filtration using a filter made of a PP material.

Preparation Example 3

A hard coating composition was prepared by mixing 30 wt % of 6-functional urethane acrylate (UA-1100H, Shin- Nakamura Chemical), 15 wt % of dendritic acrylate (MIRAMER SP1106, Miwon), 17 wt % of a conductive polymer (SAS-F16, solid content: 1%, Shin-Etsu Polymer), 3 wt % of 1-hydroxycyclohexylphenylketone, 0.3 wt % of a fluorine-based UV-curable-functional-group-containing compound (KY-1203, solid content: 20%, Shin-Etsu Chemical), and 34.7 wt % of methyl ethyl ketone using a stirrer, followed by filtration using a filter made of a PP material.

Preparation Example 4

A hard coating composition was prepared by mixing 20 wt % of 6-functional urethane acrylate (UA-1100H, Shin-Nakamura Chemical), 25 wt % of dendritic acrylate (VISCOAT #1000, Osaka Organic Chemical), 17 wt % of a conductive polymer (SAS-F16, solid content: 1%, Shin-Etsu Polymer), 3 wt % of 1-hydroxycyclohexylphenylketone, 0.3 wt % of a fluorine-based UV-curable-functional-group-containing compound (KY-1203, solid content: 20%, Shin-Etsu Chemical), and 34.7 wt % of methyl ethyl ketone using a stirrer, followed by filtration using a filter made of a PP material.

Preparation Example 5

A hard coating composition was prepared by mixing 17 wt % of 6-functional urethane acrylate (UA-1100H, Shin-Nakamura Chemical), 20 wt % of dendritic acrylate (MIRAMER SP1106, Miwon), 25 wt % of a conductive polymer (SAS-F16, solid content: 1%, Shin-Etsu Polymer), 3 wt % of 1-hydroxycyclohexylphenylketone, 0.3 wt % of a fluorine-based UV-curable-functional-group-containing compound (KY-1203, solid content: 20%, Shin-Etsu Chemical), and 34.7 wt % of methyl ethyl ketone using a stirrer, followed by filtration using a filter made of a PP material.

Preparation Example 6

A hard coating composition was prepared by mixing 20 wt % of 6-functional urethane acrylate (UA-1100H, Shin-Nakamura Chemical), 25 wt % of dendritic acrylate (MIRAMER SP1106, Miwon), 17 wt % of a conductive polymer (SAS-F16, solid content: 1%, Shin-Etsu Polymer), 3 wt % of 1-hydroxycyclohexylphenylketone, 2 wt % of a fluorine-based UV-curable-functional-group-containing compound (KY-1203, solid content: 20%, Shin-Etsu Chemical), and 33 wt % of methyl ethyl ketone using a stirrer, followed by filtration using a filter made of a PP material.

Preparation Example 7

A hard coating composition was prepared by mixing 45 wt % of 6-functional urethane acrylate (UA-1100H, Shin-Nakamura Chemical), 17 wt % of a conductive polymer (SAS-F16, solid content: 1%, Shin-Etsu Polymer), 3 wt % of 1-hydroxycyclohexylphenylketone, 0.3 wt % of a fluorine-based UV-curable-functional-group-containing compound (KY-1203, solid content: 20%, Shin-Etsu Chemical), and 34.7 wt % of methyl ethyl ketone using a stirrer, followed by filtration using a filter made of a PP material.

Preparation Example 8

A hard coating composition was prepared by mixing 20 wt % of 6-functional urethane acrylate (UA-1100H, Shin-Nakamura Chemical), 25 wt % of dendritic acrylate (MIRAMER SP1106, Miwon), 3 wt % of 1-hydroxycyclohexylphenylketone, 0.3 wt % of a fluorine-based UV-curable-functional-group-containing compound (KY-1203, solid content: 20%, Shin-Etsu Chemical), and 51.7 wt % of methyl ethyl ketone using a stirrer, followed by filtration using a filter made of a PP material.

Preparation Example 9

A hard coating composition was prepared by mixing 5 wt % of 6-functional urethane acrylate (UA-1100H, Shin-Nakamura Chemical), 5 wt % of dendritic acrylate (MIRAMER SP1106, Miwon), 70 wt % of a conductive polymer (SAS-F16, solid content: 1%, Shin-Etsu Polymer), 1 wt % of 1-hydroxycyclohexylphenylketone, 0.3 wt % of a fluorine-based UV-curable-functional-group-containing compound (KY-1203, solid content: 20%, Shin-Etsu Chemical), and 18.7 wt % of methyl ethyl ketone using a stirrer, followed by filtration using a filter made of a PP material.

Preparation Example 10

A hard coating composition was prepared by mixing 20 wt % of 6-functional urethane acrylate (UA-1100H, Shin-Nakamura Chemical), 25 wt % of dendritic acrylate (MIRAMER SP1106, Miwon), 17 wt % of a conductive polymer (SAS-F16, solid content: 1%, Shin-Etsu Polymer), 3 wt % of 1-hydroxycyclohexylphenylketone, 0.3 wt % of a silicone-based leveling agent (BYK-307, BYK), and 34.7 wt % of methyl ethyl ketone using a stirrer, followed by filtration using a filter made of a PP material.

Preparation Example 11

A hard coating composition was prepared by mixing 20 wt % of 6-functional urethane acrylate (UA-1100H, Shin-Nakamura Chemical), 25 wt % of dendritic acrylate (MIRAMER SP1106, Miwon), 17 wt % of an ATO sol (solid content: 20%, dispersed in MEK), 3 wt % of 1-hydroxycyclohexylphenylketone, 0.3 wt % of a fluorine-based UV-curable-functional-group-containing compound (KY-1203, solid content: 20%, Shin-Etsu Chemical), and 34.7 wt % of methyl ethyl ketone using a stirrer, followed by filtration using a filter made of a PP material.

Preparation Example 12

A hard coating composition was prepared by mixing 20 wt % of 6-functional urethane acrylate (UA-1100H, Shin-Nakamura Chemical), 25 wt % of dendritic acrylate (MIRAMER SP1106, Miwon), 1 wt % of a conductive polymer (SAS-F16, solid content: 1%, Shin-Etsu Polymer), 3 wt % of 1-hydroxycyclohexylphenylketone, 0.3 wt % of a fluorine-based UV-curable-functional-group-containing compound (KY-1203, solid content: 20%, Shin-Etsu Chemical), and 50.7 wt % of methyl ethyl ketone using a stirrer, followed by filtration using a filter made of a PP material.

EXAMPLES AND COMPARATIVE EXAMPLES: PREPARATION OF HARD COATING FILM

Example 1

The hard coating composition of Preparation Example 1 was applied on a polyester film (PET, 50 μm) such that the thickness thereof after curing was 5 μM, after which the solvent was dried, followed by irradiation with UV light in a cumulative dose of 600 mJ/cm² in a nitrogen atmosphere, thereby manufacturing a hard coating film.

Example 2

The hard coating composition of Preparation Example 2 was applied on a polyester film (PET, 50 μm) such that the thickness thereof after curing was 5 μM, after which the solvent was dried, followed by irradiation with UV light in a cumulative dose of 600 mJ/cm² in a nitrogen atmosphere, thereby manufacturing a hard coating film.

Example 3

The hard coating composition of Preparation Example 3 was applied on a polyester film (PET, 50 μm) such that the thickness thereof after curing was 5 μM, after which the solvent was dried, followed by irradiation with UV light in a cumulative dose of 600 mJ/cm² in a nitrogen atmosphere, thereby manufacturing a hard coating film.

Example 4

The hard coating composition of Preparation Example 4 was applied on a polyester film (PET, 50 μm) such that the thickness thereof after curing was 5 μM, after which the solvent was dried, followed by irradiation with UV light in a cumulative dose of 600 mJ/cm² in a nitrogen atmosphere, thereby manufacturing a hard coating film.

Example 5

The hard coating composition of Preparation Example 5 was applied on a polyester film (PET, 50 μm) such that the thickness thereof after curing was 5 μM, after which the solvent was dried, followed by irradiation with UV light in a cumulative dose of 600 mJ/cm² in a nitrogen atmosphere, thereby manufacturing a hard coating film.

Example 6

The hard coating composition of Preparation Example 6 was applied on a polyester film (PET, 50 μm) such that the thickness thereof after curing was 5 μM, after which the solvent was dried, followed by irradiation with UV light in a cumulative dose of 600 mJ/cm² in a nitrogen atmosphere, thereby manufacturing a hard coating film.

Example 7

The hard coating composition of Preparation Example 1 was applied on a transparent polyimide film (PI, 50 μM, Sumitomo Chemical) such that the thickness thereof after curing was 5 μM, after which the solvent was dried, followed by irradiation with UV light in a cumulative dose of 600 mJ/cm² in a nitrogen atmosphere, thereby manufacturing a hard coating film.

Comparative Example 1

The hard coating solution of Preparation Example 7 was applied on a polyester film (PET, 50 μm) such that the thickness thereof after curing was 5 μM, after which the solvent was dried, followed by irradiation with UV light in a cumulative dose of 600 mJ/cm² in a nitrogen atmosphere, thereby manufacturing a hard coating film.

Comparative Example 2

The hard coating composition of Preparation Example 8 was applied on a polyester film (PET, 50 μm) such that the thickness thereof after curing was 5 μM, after which the solvent was dried, followed by irradiation with UV light in a cumulative dose of 600 mJ/cm² in a nitrogen atmosphere, thereby manufacturing a hard coating film.

Comparative Example 3

The hard coating composition of Preparation Example 9 was applied on a polyester film (PET, 50 μm) such that the thickness thereof after curing was 5 μM, after which the solvent was dried, followed by irradiation with UV light in a cumulative dose of 600 mJ/cm² in a nitrogen atmosphere, thereby manufacturing a hard coating film.

Comparative Example 4

The hard coating composition of Preparation Example 10 was applied on a polyester film (PET, 50 μm) such that the thickness thereof after curing was 5 μM, after which the solvent was dried, followed by irradiation with UV light in a cumulative dose of 600 mJ/cm² in a nitrogen atmosphere, thereby manufacturing a hard coating film.

Comparative Example 5

The hard coating composition of Preparation Example 11 was applied on a polyester film (PET, 50 μm) such that the thickness thereof after curing was 5 μM, after which the solvent was dried, followed by irradiation with UV light in a cumulative dose of 600 mJ/cm² in a nitrogen atmosphere, thereby manufacturing a hard coating film.

Comparative Example 6

The hard coating composition of Preparation Example 12 was applied on a polyester film (PET, 50 μm) such that the thickness thereof after curing was 5 μM, after which the solvent was dried, followed by irradiation with UV light in a cumulative dose of 600 mJ/cm² in a nitrogen atmosphere, thereby manufacturing a hard coating film.

Test Example 1: Measurement of Transmittance

For each of the hard coating films manufactured in Examples and Comparative Examples, transmittance was measured using a haze meter HM-150N made by Murakami. The results thereof are shown in Table 1 below.

Test Example 2: Evaluation of Scratch Resistance

For each of the hard coating films manufactured in Examples and Comparative Examples, a substrate film was attached to glass using a transparent pressure-sensitive adhesive such that the surface of the hard coating layer of the hard coating film was oriented upwards, after which reciprocating friction was applied thereto 10 times under a load of 500 g/cm² using steel wool (#0000), and scratches in the portion subjected to friction were observed with the naked eye through transmission and reflection using a triple-wavelength lamp, whereby scratch resistance was evaluated. The evaluation criteria were as follows, and the results thereof are shown in Table 1 below.

<Evaluation Criteria>
∘: 0 to 10 scratches are visible
Δ: 20 or fewer but more than 10 scratches are visible
x: more than 20 scratches are visible Test Example 3: Evaluation of Antifouling Performance (Measurement of Initial Contact Angle)

For each of the hard coating films manufactured in Examples and Comparative Examples, a water contact angle was measured using a contact angle meter DSA100 made by KRUSS. The volume of the liquid (water) droplet at room temperature was 3 μl, and the results thereof are shown in Table 1 below. Here, since a higher contact angle means that the surface of the hard coating layer has lower surface energy, antifouling performance can be evaluated to be superior with an increase in the contact angle.

Test Example 4: Evaluation of Wear Resistance

The surface of each of the hard coating films manufactured in Examples and Comparative Examples was worn using a wear resistance tester made by Daesung Precision Machine. Specifically, the surface of the hard coating layer of the hard coating film was rubbed and worn 3000 times under a load of 500 g using an eraser for wear resistance testing, after which the water contact angle thereof was measured using a contact angle meter DSA100 made by KRUSS. The results thereof are shown in Table 1 below.

Test Example 5: Evaluation of Chemical Resistance

Ethanol was dropped on the surface of each of the hard coating films manufactured in Examples and Comparative Examples, after which the surface thereof was worn using a wear resistance tester made by Daesung Precision Machine. Specifically, ethanol was dropped on the surface of the hard coating layer of the hard coating film, the surface thereof was rubbed 3000 times under a load of 500 g using an eraser for wear resistance testing, and the water contact angle was measured using a contact angle meter DSA100 made by KRUSS. The results thereof are shown in Table 1 below.

Test Example 6: Evaluation of Bending Resistance

Each of the hard coating films manufactured in Examples and Comparative Examples was tested by being repeatedly folded and unfolded 200,000 times with a radius of curvature of 1 mm such that the surface of the hard coating layer was folded inwards, and whether the film was broken was observed. The evaluation criteria were as follows, and the results thereof are shown in Table 1 below.
<Evaluation Criteria>
∘: No breakage
x: Breakage Test Example 7: Measurement of Surface Resistance For each of the hard coating films manufactured in Examples and Comparative Examples, surface resistance was measured by applying a voltage of 500 V to the surface of the hard coating layer using a surface resistance meter (MCP-HT450, Mitsubishi Chemical Analytech). The results thereof are shown in Table 1 below (unit: Ω/□).

Test Example 8: Evaluation of Surface Resistance Reliability

Each of the hard coating films manufactured in Examples and Comparative Examples was allowed to stand under conditions of a temperature of 85° C. and a humidity of 85% for 15 days, after which the surface resistance of the hard coating layer was measured by applying a voltage of 500 V to the surface of the hard coating layer of the film using a surface resistance meter (MCP-HT450, Mitsubishi Chemical Analytech). The results thereof are shown in Table 1 below (unit: Ω/□).

Test Example 9: Measurement of Surface Roughness Ra

The average roughness Ra value of the surface of the hard coating layer of each of the hard coating films manufactured in Examples and Comparative Examples was measured using AFM. The specific measurement conditions were as follows, and the results thereof are shown in Table 1 below.
<Measurement Conditions>
Non-contact mode, scan size: 1 μM×1 μM, scan rate: 1.0 Hz

TABLE 1

|  | Transmittance (%) | Scratch resistance | Contact angle (°) | Wear resistance (°) | Chemical resistance (°) | Bending resistance | Surfaces resistance (Ω/□) | Surfaces resistance reliability (Ω/□) | Surface roughness (nm) |
|---|---|---|---|---|---|---|---|---|---|
| Example 1 | 89.70 | ∘ | 111 | 103 | 98 | ∘ | 2.00E+10 | 4.00E+10 | 0.436 |
| Example 2 | 89.80 | ∘ | 111 | 105 | 102 | ∘ | 8.00E+09 | 1.00E+10 | 0.434 |
| Example 3 | 89.40 | ∘ | 110 | 98 | 97 | ∘ | 4.00E+10 | 1.00E+10 | 0.428 |
| Example 4 | 89.70 | ∘ | 112 | 97 | 96 | ∘ | 9.00E+09 | 7.00E+09 | 0.512 |
| Example 5 | 89.30 | ∘ | 111 | 101 | 100 | ∘ | 3.00E+09 | 5.00E+09 | 0.354 |
| Example 6 | 89.80 | ∘ | 115 | 107 | 106 | ∘ | 5.00E+10 | 1.00E+10 | 0.223 |
| Example 7 | 89.50 | ∘ | 110 | 97 | 101 | ∘ | 7.00E+10 | 3.00E+10 | 0.617 |
| Comparative Example 1 | 89.30 | ∘ | 110 | 96 | 95 | x | 9.00E+10 | 2.00E+11 | 0.494 |
| Comparative Example 2 | 90.10 | ∘ | 111 | 99 | 96 | ∘ | OVER | OVER | 0.564 |
| Comparative Example 3 | 81.10 | x | 108 | 82 | 69 | ∘ | 2.00E+07 | 8.00E+06 | 0.691 |
| Comparative Example 4 | 89.70 | Δ | 91 | 75 | 48 | ∘ | 1.00E+10 | 8.00E+09 | 0.634 |

TABLE 1-continued

|  | Transmittance (%) | Scratch resistance | Contact angle (°) | Wear resistance (°) | Chemical resistance (°) | Bending resistance | Surfaces resistance (Ω/□) | Surfaces resistance reliability (Ω/□) | Surface roughness (nm) |
|---|---|---|---|---|---|---|---|---|---|
| Comparative Example 5 | 89.10 | ○ | 109 | 72 | 61 | ○ | 3E+10 | 4E+11 | 4.221 |
| Comparative Example 6 | 89.90 | ○ | 112 | 104 | 101 | ○ | OVER | OVER | 0.421 |

As is apparent from Table 1, in Examples 1 to 7, satisfying all the composition requirements of the present invention, superior scratch resistance and a high contact angle were exhibited, resulting in superior antifouling performance compared to Comparative Examples 1 to 6, not satisfying any of the composition requirements of the present invention.

In Examples, the water contact angle was satisfactory even when exposed to harsh environmental conditions (physical or chemical wear), so superior antifouling performance was maintained even in the presence of variously changing environmental conditions. Moreover, the hard coating films of Examples were confirmed to be applicable to flexible display devices because of the superior bending resistance thereof, and furthermore, superior antistatic performance was exhibited based on the surface resistance value thereof, and retention of antistatic performance was manifested by maintaining the surface resistance value without a great change even after being subjected to harsh environmental conditions of high temperature and high humidity.

In contrast, in the case of Comparative Example 4, using inorganic fine particles, the surface toughness value was increased and thus antifouling performance was deteriorated.

What is claimed is:

1. A hard coating film, comprising:
a substrate; and
a hard coating layer provided on at least one surface of the substrate,
wherein the hard coating layer is formed from a hard coating composition comprising a fluorine-based UV-curable-functional-group-containing compound, a conductive polymer and a solvent,
wherein a solid content of the conductive polymer is 0.05 to 5 wt % based on a total of 100 wt % of a solid content of the hard coating composition,
wherein the hard coating layer does not comprise inorganic particles,
wherein a surface resistance value when a voltage of 500 V is applied to a surface of the hard coating layer is 1E+8Ω/□ to 1E+12Ω/□,
wherein a surface roughness (Ra) value of the hard coating layer, measured using an atomic force microscope (AFM) (Measurement conditions: non-contact mode, scan size: 1 μm×1 μm, scan rate: 1.0 Hz), is 1 nm or less,
wherein the inorganic particles are at least one selected from a group consisting of $SiO_2$, $Al_2O_3$, ZnO, $ZrO_2$, $BaTiO_3$, $TiO_2$, $Ta_2O_5$, $Ti_3O_5$, ITO, IZO, ATO, ZnO—Al, $Nb_2O_3$, SnO, $SnO_2$, MgO, and $Sb_2O_5$, and
wherein a water contact angle, measured after a surface of the hard coating layer of the hard coating film is rubbed and worn 3000 times under a load of 1 kg using an eraser for wear resistance testing, is 95° or more.

2. The hard coating film of claim 1, wherein the hard coating composition further comprises at least one selected from the group consisting of a light-transmissive resin, a photoinitiator, and an additive.

3. The hard coating film of claim 2, wherein the light-transmissive resin comprises dendritic acrylate.

4. The hard coating film of claim 3, wherein a solid content of the dendritic acrylate is 3 to 90 wt % based on a total of 100 wt % of a solid content of the hard coating composition.

5. The hard coating film of claim 1, wherein the conductive polymer is a thiophene-based polymer.

6. The hard coating film of claim 1, wherein a solid content of the fluorine-based-UV-curable-functional-group-containing compound is 0.01 to 10 wt % based on a total of 100 wt % of the solid content of the hard coating composition.

7. The hard coating film of claim 1, wherein the water contact angle, measured after ethanol is dropped on a surface of the hard coating layer and then the surface of the hard coating layer is rubbed 3000 times under a load of 1 kg using an eraser for wear resistance testing, is 95° or more.

8. The hard coating film of claim 1, wherein a surface resistance value when a voltage of 500 V is applied to a surface of the hard coating layer after the hard coating film is allowed to stand under conditions of a temperature of 85° C. and a humidity of 85% for 15 days is 1E+8Ω/□ to 5E+12Ω/□.

9. A window comprising the hard coating film according to claim 1.

10. An image display device comprising the window of claim 9 and a display panel, and further comprising a touch sensor and a polarizing plate between the window and the display panel.

* * * * *